United States Patent
Hanko et al.

(10) Patent No.: US 6,438,141 B1
(45) Date of Patent: Aug. 20, 2002

(54) METHOD AND MANAGEMENT OF COMMUNICATIONS OVER MEDIA OF FINITE BANDWIDTH

(75) Inventors: James Hanko, Redwood City; Jerry Wall, San Jose; Duane Northcutt, Menlo Park; Lawrence Butcher, Mountain View; Alan T. Ruberg, Foster City, all of CA (US); Herbert Bos, Cambridge (GB)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/063,491

(22) Filed: Apr. 20, 1998

(51) Int. Cl.⁷ .............................. H04J 3/18; H04J 3/16; H04L 12/26
(52) U.S. Cl. .................. 370/477; 370/252; 370/468
(58) Field of Search ............................. 370/229, 230, 370/231–235, 252, 254, 468, 420, 421, 477; 709/104, 219, 225, 226, 227, 228, 229, 232, 234, 235; 710/29

(56) References Cited

U.S. PATENT DOCUMENTS

| | | |
|---|---|---|
| 5,291,585 A | 3/1994 | Sato et al. |
| 5,335,320 A | 8/1994 | Iwata et al. |
| 5,345,550 A | 9/1994 | Bloomfield |
| 5,347,627 A | 9/1994 | Hoffmann et al. |
| 5,359,593 A | 10/1994 | Derby et al. |
| 5,367,523 A | 11/1994 | Chang et al. |
| 5,384,911 A | 1/1995 | Bloomfield |
| 5,412,772 A | 5/1995 | Monson |
| 5,414,806 A | 5/1995 | Richards |
| 5,423,034 A | 6/1995 | Cohen-Levy et al. |
| 5,430,836 A | 7/1995 | Wolf et al. |
| 5,436,637 A | 7/1995 | Gayraud et al. |
| 5,448,695 A | 9/1995 | Douglas et al. |
| 5,461,399 A | 10/1995 | Cragun |
| 5,461,710 A | 10/1995 | Bloomfiled et al. |
| 5,473,745 A | 12/1995 | Berry et al. |
| 5,491,784 A | 2/1996 | Douglas et al. |
| 5,493,638 A | 2/1996 | Hooper |
| 5,509,116 A | 4/1996 | Hiraga et al. |
| 5,526,517 A | 6/1996 | Jones et al. |
| 5,544,170 A * | 8/1996 | Kasahara ................. 370/253 |
| 5,544,288 A | 8/1996 | Morgan et al. |
| 5,546,519 A | 8/1996 | Berry |
| 5,548,702 A | 8/1996 | Li et al. |
| 5,550,968 A | 8/1996 | Miller et al. |
| 5,559,942 A | 9/1996 | Gough et al. |
| 5,564,003 A | 10/1996 | Bell et al. |

(List continued on next page.)

OTHER PUBLICATIONS

Ronald L. Johnston, "The Dynamic Incremental Compiler of APL/3000" Proceedings of the API '79 Conference, published as APL Quote Quad, 9(4), pp. 82–87.

Leo J. Guibas et al., "Compilation and Delayed Evaluation in APL," Fifth Annual Synposium on Principles in Programming Languages, pp. 1–8, 1978.

Gleen Krasner "The Smalltalk–80 Virtual Machine" BYTE Publications Inc., Aug. 1991, pp. 300–320.

Primary Examiner—Huy D. Vu
Assistant Examiner—Steven Nguyen
(74) Attorney, Agent, or Firm—O'Melveny & Myers LLP

(57) ABSTRACT

The invention provides a method and apparatus for management of communications over media of finite bandwidth. One embodiment of the invention allows management of communications comprising a plurality of data streams from a plurality of sources. One embodiment of the invention effectively quantifies and controls data streams comprising data transferred at either regular or irregular data rates. One embodiment of the invention provides for estimation of data rate needs, measurement and analysis of current and historical data rate parameters, dynamic allocation of available bandwidth, and supports cooperation between data sources and destinations in the management processes.

21 Claims, 13 Drawing Sheets

U.S. PATENT DOCUMENTS

| | | |
|---|---|---|
| 5,566,330 A | 10/1996 | Sheffield |
| 5,570,462 A | 10/1996 | McFarland |
| 5,572,643 A | 11/1996 | Judson |
| 5,694,603 A | 12/1997 | Reiffin |
| 5,694,604 A | 12/1997 | Reiffin |
| 5,946,324 A * | 8/1999 | Mishra et al. ............... 370/468 |
| 6,003,062 A * | 12/1999 | Greenberg et al. |
| 6,049,526 A * | 4/2000 | Radhakrishnan et al. ... 370/229 |
| 6,115,748 A * | 9/2000 | Hauser et al. .............. 709/234 |

* cited by examiner

METHOD AND MANAGEMENT OF COMMUNICATIONS OVER MEDIA OF FINITE BANDWIDTH

BACKGROUND OF THE INVENTION

1. Field of the Invention

The invention relates generally to communication of information and, more particularly, to management of communication of information over media of finite bandwidth.

2. Background Art

Sun, Sun Microsystems, the Sun logo, Solaris, "Write Once, Run Anywhere", Java, JavaOS, JavaStation, HotJava Views and all Java-based trademarks and logos are trademarks or registered trademarks of Sun Microsystems, Inc. in the United States and other countries.

The overall performance of a computing system having components that are physically separated from one another is often limited by the rate at which information may be moved between the components. The communication media for transferring the information between the components has a limit as to the amount of information that can be transferred over it in a given amount of time. This limit is referred to as the bandwidth of the communication media. This limit is, in some sense, analogous to the maximum amount of water that can be pumped through a particular size of pipe in a given amount of time. While water pumped through a pipe may be measured in gallons per minute, for example, the bandwidth of a communication medium is often expressed in bits per second, where each bit is a binary digit. A binary digit is a small unit of information that has either the value zero or the value one and from which other larger units of information may be constructed.

Furthermore, just as a cable television company may combine the signals from many television programs to be carried over one high-capacity cable, it is sometimes desirable to transmit information from multiple sources through a communication medium. In some configurations, multiple sources may transmit information to a single destination, for example, a single user terminal.

However, information passed between components of a computing system is often passed at an irregular rate. For example, much information might be transferred to send a document to a user terminal for display, but little information might be transferred while a user reads the document while it is displayed on the user terminal. Thus, the information may be passed in short bursts of large amounts of information followed by long periods of small amounts of information.

Moreover, each of the multiple sources transmitting information might transmit their respective information irregularly, with large variations between times of high transmission rates and times of low transmission rates. Thus, situations may occur where multiple sources attempt high transmission rates simultaneously. If the instantaneous demand for information transmission exceeds the bandwidth of the communication medium, not all of the information will be able to be passed through the communication medium at the rate it is being fed to the communication medium. Thus, a technique is needed to manage the flow of information through a communication medium and prevent such congestion of the medium from interfering with efficient transfer of information.

Additionally, it is not always the communication medium that is responsible for creating a bottleneck to effective communications. In some instances, it is one or more elements of the computing apparatus linked by the communication media that causes a bottleneck. For example, some commands instructing computing apparatus to perform certain tasks may be very short, but the tasks requested may be very complex and time-consuming. Under such circumstances, the command itself is so short that it will not result in congestion when transmitted over a communication medium, but, by instructing the computing apparatus to perform complex tasks, it may overload the capability of the computing apparatus to process other tasks simultaneously. Thus, a technique is also needed to manage the load placed on the computing apparatus by multiple commands that may come from multiple sources.

One example of a type of computing apparatus that can easily be instructed to perform complex tasks as a result of simple commands is a graphic display, for example, a video monitor or flat panel display. Such displays are comprised of large numbers of small image areas, the color and intensity of which may be individually selectively controlled. These small image areas are referred to as picture elements, or pixels. The display as a whole is a mosaic of pixels used to form characters, symbols, images, or other graphic elements being displayed. However, the process by which the pixels and, consequently, the image being displayed is changed requires time to effect the desired change of pixel colors and intensities. Thus, multiple commands instructing multiple simultaneous changes in an image may overload a graphic display device. Therefore, graphic display device can also be characterized as having a limited bandwidth, with the bandwidth expressed in, for example, pixels per second.

In the past, various attempts were made to accommodate data from multiple sources wherein the cumulative data rate of all such data to be transmitted exceeds the bandwidth of the medium over which the data is to be transmitted. One approach penalizes each of the multiple sources of data to an equal extent. This approach reduces the maximum data rate allocated to each of the sources of data. Thus, the rate at which data is transmitted is reduced for each source. For example, if the cumulative data rate at which the multiple sources would ideally send data is 20 megabits/second (Mbps), but the communication medium is limited to 10 Mbps of bandwidth, the maximum data rate allowed to each source could be cut by 50 percent to prevent overloading the 10 Mbps medium.

While this approach sounds simple and equitable, the effects of reducing the maximum data rate allowed by 50 percent will not affect all sources equally. For example, a source that is allocated, say 4 Mbps of maximum allowable data rate, might normally only transmit data at a rate around 1 Mbps, but occasionally transmit short bursts of data closer to the 4 Mbps rate. If its 4 Mbps allocation is reduced to 2 Mbps, the source will still be allocated twice as much bandwidth as it normally needs, so no adverse effects would be noticed while the data rate remains around 1 Mbps. Only during the bursts of data approaching the 4 Mbps data rate would the data transmission be affected by the 2 Mbps rate limit.

On the other hand, for a source that normally transmits data at a small, but relatively consistent, data rate, a reduction of data rate limit by 50 percent would severely affect the data transmission. Since only half the amount of data could be passed within the same amount of time, a backlog would instantly develop and continue to get worse as long as the lower data rate limit was in place and the consistent data rate attempted by the source was maintained.

Thus, a common reduction of all data rates in response to communication attempts in excess of the capacity of the medium does not fairly and evenly affect all data sources. Data sources exhibiting smaller and more consistent data rates are often affected more severely than data sources that have been allocated large data rate limits or that are more irregular in their data transmission.

Another approach uses a "first-come, first-served" principle, where bandwidth is awarded to the first requester in whatever amount the first requester desires. This approach obviously provides no disincentive for inefficient requests and unfairly penalizes later requesters.

Another scheme that has been used awards more bandwidth to sources exhibiting a high demand for bandwidth. Such an approach may consider the source requesting the most bandwidth to be the most important source and the other sources requesting less bandwidth to be less important sources. Thus, the scheme gives more bandwidth to what it deems to be the most important source, while penalizing what it deems to be the sources of lesser importance.

The problem with such a scheme is that sources attempting to be efficient and use as little bandwidth as possible are penalized more than those that are inefficient and waste the available bandwidth. Moreover, some sources that transmit data at low data rates are actually very important. For example, a keyboard typically generates data only as fast as a user's fingers can depress the keys, which is typically slow by comparison to other processes with which a computer may be involved. However, if the maximum data rate allocated to a keyboard is severely restricted, a user will begin to feel that the computer is out of control since it does not respond rapidly to the user's keystrokes. Thus, such a scheme is also less than ideal.

Another approach involves what is referred to as time division multiplexing (TDM). TDM breaks the data from each source into portions that are discontinuous in time. Then, a first source is allowed to use the entire bandwidth of the communication medium for a small, measured amount of time. When its time is finished, a second source is allowed to use the entire bandwidth of the communication medium for another small, measured amount of time. When all sources have been allowed to use the full capacity of the communication medium for a short period of time, the process is repeated with the first source.

To allocate the bandwidth of the communication medium between the needs of the different sources, the different sources can each be awarded different durations of time, or time slices, within which to operate. Thus, a source that is awarded a 2 millisecond (mS) time slice when the total duration of the time slices of all sources is 10 mS is effectively allocated 20 percent of the available bandwidth of the communication medium.

However, TDM techniques are not without disadvantages. For example, a method is needed to allocate the appropriate time slices to the sources, as well as to ensure that the sources will not transmit data outside of their designated time slices. Moreover, a technique is needed to splice together data transmitted at the end of one time slice and data transmitted at the beginning of the subsequent time slice for the same source.

Thus, the attempts of the past do not provide an efficient and equitable technique for managing communications over media of finite bandwidth.

SUMMARY OF THE INVENTION

The invention provides a method and apparatus for managing the communication of information. One embodiment of the invention allows management of communications comprising a plurality of data streams from a plurality of sources. One embodiment of the invention effectively quantifies and controls data streams comprising data transferred at either regular or irregular data rates. One embodiment of the invention provides for estimation of data rate needs, measurement and analysis of current and historical data rate parameters, dynamic allocation of available bandwidth, and supports cooperation between data sources and destinations in the management processes.

One embodiment of the invention avoids the inequitable reduction of bandwidth for efficient sources using little bandwidth. One embodiment of the invention avoids rewarding sources that unnecessarily use large amounts of bandwidth. One embodiment of the invention equitably and efficiently allocates available bandwidth among sources that provide regular data streams and those that provides irregular data streams. The invention also avoids the complexities associated with time division multiplexing.

In one embodiment of the invention, data sources generate accurate estimates of bandwidth needs. Based on these estimates, the data sources generate requests for bandwidth. The data sources send the requests to the intended receiver of the data. The receiver allocates available bandwidth in the communication medium based on these requests from the data sources and advises the sources of their allocations.

While the receiver attempts to allocate each data source its full requested bandwidth, the finite bandwidth limit of the communication medium sometimes prevents such allocation. When the total requested bandwidth exceeds the total available bandwidth, the receiver attempts to fully grant the requests of sources that are requesting relatively small amounts of bandwidth, while granting reduced allocations of bandwidth to sources that are requesting relatively large amounts of bandwidth.

Thus, only the sources that require the most bandwidth are affected by the limitation. All other sources are unaffected and are granted the full amount of bandwidth they requested. Moreover, by reducing the allocations for only sources that require large amounts of bandwidth, a large reduction in allocated bandwidth can be achieved by reducing each requested large allocation by only a small percentage. Thus, the average percentage reduction in bandwidth allocations is greatly reduced.

One embodiment of the invention provides a technique for predicting future bandwidth requirements of the sources. The technique utilizes historical information concerning data rates and applies an exponential moving average (EMA) method to predict anticipated future data rates. One embodiment of the EMA method incorporates an asymmetric technique for adapting bandwidth allocations more quickly to increases in data rates than to decreases in data rates. This asymmetric feature avoids the tendency to unduly decrease allocated bandwidth for a source merely because of a temporary lull in the data transmission. The parameters of the EMA method can be selected to provide any desired statistical measurement of data rates, for example, a close approximation of the mean plus one standard deviation on normally distributed streams of data or sets of bandwidth allocations.

DETAILED DESCRIPTION OF THE INVENTION

A method and apparatus for managing communications over media of finite bandwidth is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 12:
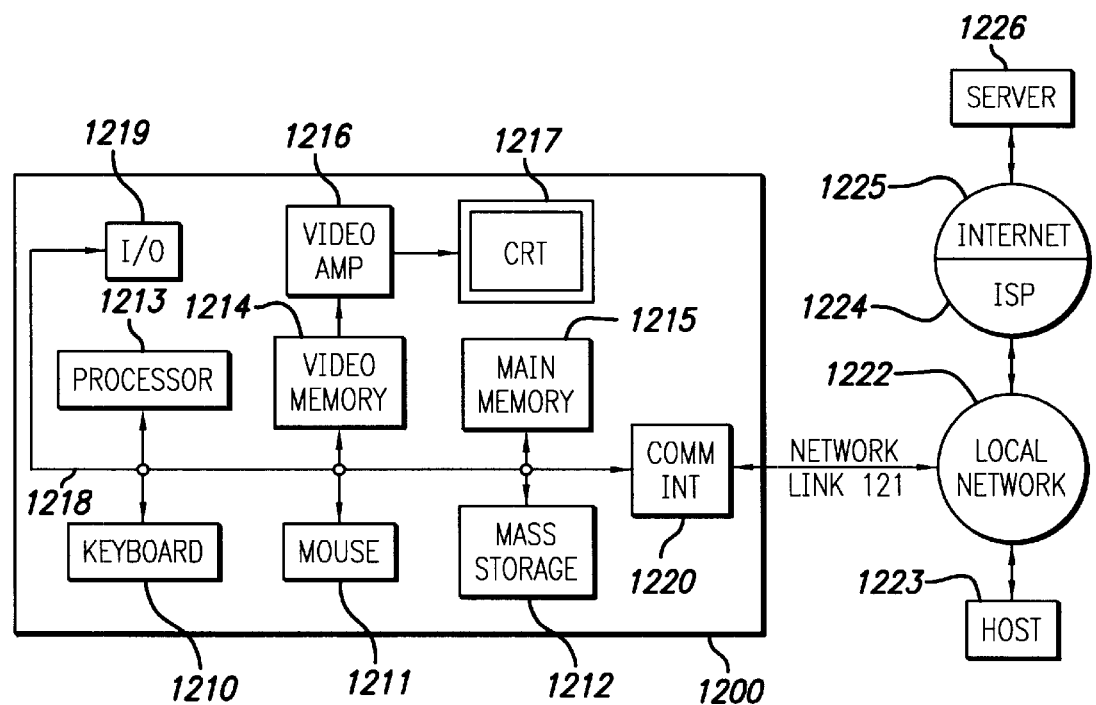
FIG. 12 is a block diagram of one embodiment of a computer system capable of providing a suitable execution environment for an embodiment of the invention.
Figure 13:
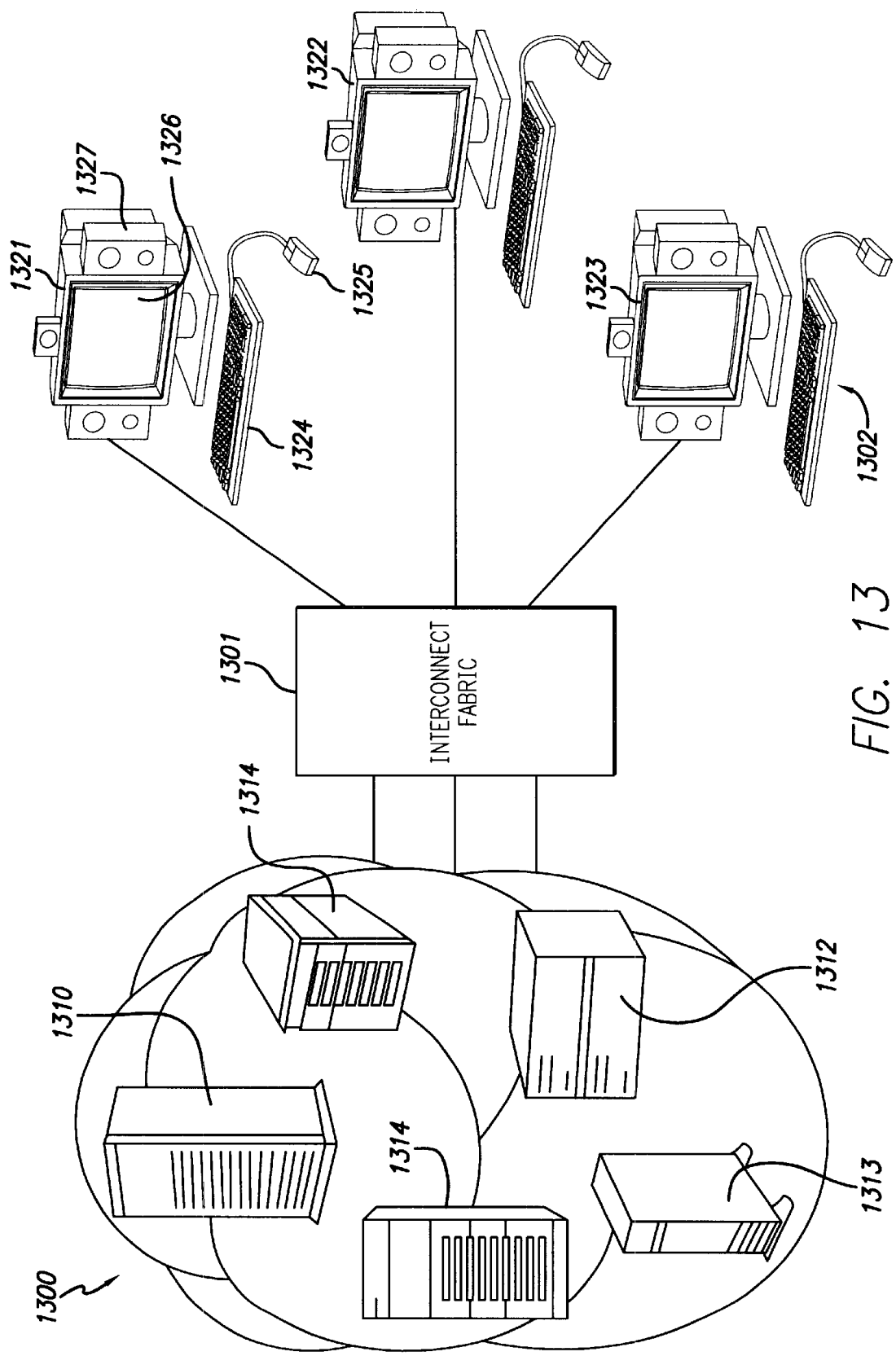
FIG. 13 is a block diagram illustrating a system of computational service producers, an interconnect fabric, and human interface devices according to one embodiment of the invention.
Figure 14:
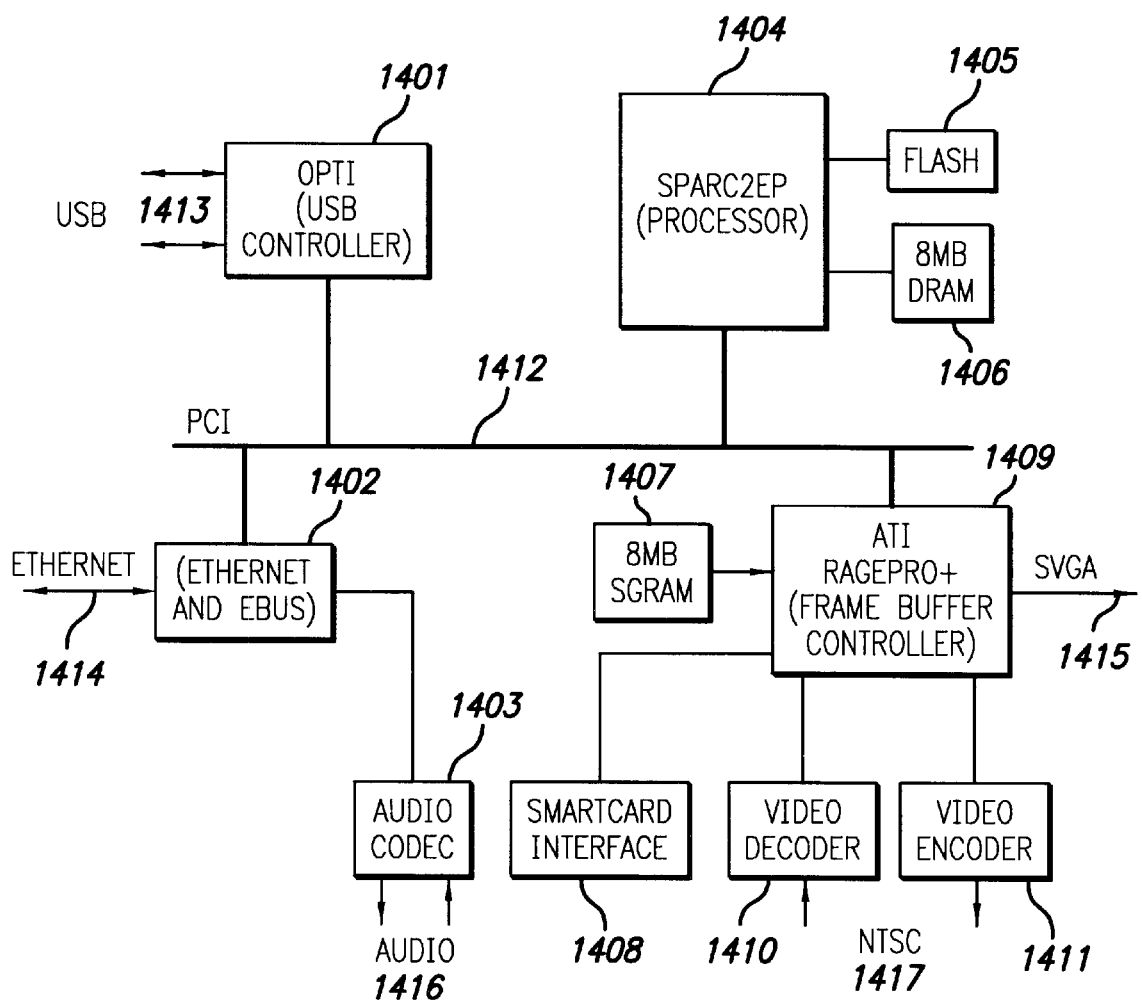
FIG. 14 is a block diagram illustrating one possible architecture of a human interface device according to one embodiment of the invention.

FIGS. 12, 13, and 14 provide examples of system architectures used in one or more embodiments of the invention. The present invention can be implemented in standard desktop computer systems such as described in FIG. 12, or in any other computer systems, including client-server systems, network computers, or the human interface device system of FIGS. 13 and 14.

Embodiment of Computer Execution Environment (Hardware)

An embodiment of the invention can be implemented as computer software in the form of computer readable code executed on a general purpose computer such as computer 1200 illustrated in FIG. 12, or in the form of bytecode class files executable within a Java™ runtime environment running on such a computer. A keyboard 1210 and mouse 1211 are coupled to a bi-directional system bus 1218. The keyboard and mouse are for introducing user input to the computer system and communicating that user input to processor 1213. Other suitable input devices may be used in addition to, or in place of, the mouse 1211 and keyboard 1210. I/O (input/output) unit 1219 coupled to bi-directional system bus 1218 represents such I/O elements as a printer, A/V (audio/video) I/O, etc.

Computer 1200 includes a video memory 1214, main memory 1215 and mass storage 1212, all coupled to bi-directional system bus 1218 along with keyboard 1210, mouse 1211 and processor 1213. The mass storage 1212 may include both fixed and removable media, such as magnetic, optical or magnetic optical storage systems or any other available mass storage technology. Bus 1218 may contain, for example, thirty-two address lines for addressing video memory 1214 or main memory 1215. The system bus 1218 also includes, for example, a 32-bit data bus for transferring data between and among the components, such as processor 1213, main memory 1215, video memory 1214 and mass storage 1212. Alternatively, multiplex data/address lines may be used instead of separate data and address lines.

In one embodiment of the invention, the processor 1213 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the cathode ray tube (CRT) raster monitor 1217. Alternatively, the video memory could be used to drive a flat panel or liquid crystal display (LCD), or any other suitable data presentation device. Video amplifier 1216 is well known in the art and may be implemented by any suitable apparatus. This circuitry converts pixel data stored in video memory 1214 to a raster signal suitable for use by monitor 1217. Monitor 1217 is a type of monitor suitable for displaying graphic images.

Computer 1200 may also include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Wireless links, digital subscriber lines (DSLs), or cable modems may also be used. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to local server computer 1223 or to data equipment operated by an Internet Service Provider (ISP) 1224. ISP 1224 in turn provides data communication services through the world wide packet data communication network now commonly referred to as the "Internet" 1225. Local network 1222 and Internet 1225 both use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Computer 1200 can send messages and receive data, including program code, through the network(s), network link 1221, and communication interface 1220. In the Internet example, remote server computer 1226 might transmit a requested code for an application program through Internet 1225, ISP 1224, local network 1222 and communication interface 1220.

The received code may be executed by processor 1213 as it is received, and/or stored in mass storage 1212, or other non-volatile storage for later execution. In this manner, computer 1200 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

Human Interface Device Computer System

The invention also has application to a computer systems where the data to be displayed is provided through a network. The network can be a local area network, a wide area network, the internet, world wide web, or any other suitable network configuration. One embodiment of the invention is used in computer system configuration referred to herein as a human interface device computer system.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 13. Referring to FIG. 13, the system consists of computational service providers 1300 communicating data through interconnect fabric 1301 to HIDs 1302.

Computational Service Providers—In the HID system, the computational power and state maintenance is found in the service providers, or services. The services are not tied to a specific computer, but may be distributed over one or more traditional desktop systems such as described in connection with FIG. 12, or with traditional servers. One computer may have one or more services, or a service may be implemented by one or more computers. The service provides computation, state, and data to the HIDs and the service is under the control of a common authority or manager. In FIG. 13, the services are found on computers 1310, 1311, 1312, 1313, and 1314.

Examples of services include X11/Unix services, archived video services, Windows NT service, Java™ program execution service, and others.

A service herein is a process that provides output data and responds to user requests and input.

Interconnection Fabric—In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the services. FIG. 13 illustrates HIDs 1321, 1322, and 1323. A HID consists of a display 1326, a keyboard 1324, mouse 1325, and audio speakers 1327. The HID includes the electronics need to interface these devices to the interconnection fabric and to transmit to and receive data from the services.

A block diagram of the HID is illustrated in FIG. 14. The components of the HID are coupled internally to a PCI bus 1412. A network control block 1402 communicates to the interconnect fabric, such as an ethernet, through line 1414. An audio codec 1403 receives audio data on interface 1416 and is coupled to block 1402. USB data communication is provided on lines 1413 to USB controller 1401.

An embedded processor 1404 may be, for example, a Sparc2ep with coupled flash memory 1405 and DRAM 1406. The USB controller 1401, network controller 1402 and embedded processor 1404 are all coupled to the PCI bus 1412. Also coupled to the PCI 1412 is the video controller 1409. The video controller 1409 may be for example, and ATI RagePro+ frame buffer controller that provides SVGA output on line 1415. NTSC data is provided in and out of the video controller through video decoder 1410 and video encoder 1411 respectively. A smartcard interface 1408 may also be coupled to the video controller 1409.

The computer systems described above are for purposes of example only. An embodiment of the invention may be implemented in any type of computer system or programming or processing environment.

When the cumulative data rate of multiple data sources transmitting data over a medium exceeds the bandwidth of the medium, the medium is incapable of transmitting all of the data at the desired data rates. To maintain the data transmission within the bandwidth limit of the medium, some of the data must be delayed or not sent at all. However, when multiple sources are transmitting varying amounts of data at varying times, the selection of which data is to be delayed or dropped becomes quite complex. Inappropriate selection of data to be delayed or dropped can result in severe reductions in system performance. Thus, a technique is needed to manage the communication of data from multiple sources over a medium of finite bandwidth, where the cumulative bandwidth needs of the multiple sources may exceed the bandwidth of the medium.

In one embodiment of the invention, multiple data sources are coupled to a data receiver through a communication medium. The data sources may be any source of information, and the information may be of any type or of multiple types. For example, the information may be computer program code, text, audio data, video data, graphical data, data representative of conditions or events, digital information, analog information, or any other information in any other form. Examples of data sources include computer equipment, audio devices, video devices, user input devices, information storage devices, network equipment, sensors, identification devices, or any other sources of information.

When information is to be sent from a data source to a data receiver, the data source predicts the amount of bandwidth that will be needed to transfer the information at an acceptable data rate. The data source sends an estimate of its bandwidth needs to the data receiver. In an environment with multiple data sources, the data receiver receives estimates of bandwidth needs from multiple data sources. The data receiver adds the estimates of bandwidth needs of the multiple data sources to obtain the cumulative data rate requested by the multiple data sources. The data receiver compares the cumulative data rate requested to the bandwidth of the communication medium over which the information is to pass. If the cumulative data rate requested is less than the bandwidth of the medium, the data receiver does not limit the data rate of any of the multiple data sources. The data receiver allocates to each data source the full amount of bandwidth requested by that data source.

However, if the cumulative data rate requested exceeds the bandwidth of the communication medium, the data receiver compares the amount of bandwidth requested by each data source. For the data sources requesting relatively low amounts of bandwidth, the data receiver allocates all of the requested bandwidth. For the data sources requesting relatively high amounts of bandwidth, the data receiver allocates only a portion of the bandwidth requested. The data receiver balances the benefits of only slightly reducing the requested bandwidth with the benefits of not reducing the requested bandwidth at all to determine the number of data sources affected by the reduction and the extent of bandwidth reduction for each affected data source.

In one embodiment of the invention, data sources produce estimates of the bandwidth they will likely require by monitoring commands being sent to the data receiver. For example, a data source comprising an X window server monitors commands sent to an X window client program. By monitoring such commands, the X window server can determine the number of bits and the number of pixels to be transmitted and an ideal period of time over which such transmission should occur. By dividing the number of bits by the ideal period of time, the X window server can obtain an ideal data rate expressed in bits per second for the data generated by the commands. Likewise, by dividing the number of pixels by the ideal period of time, the X window server can obtain an ideal data rate expressed in pixels per second for the data generated by the commands. These ideal data rates can be used as initial estimates of bandwidth needs.

As this monitoring and estimation process continues, the historical information concerning the data rates can be used to produce statistical parameters descriptive of the data rates. For example, the average data rate or a data rate equal to the average data rate plus one standard deviation can be accurately approximated and used to determine future bandwidth allocations.

The data sources can perform such monitoring, analysis, and estimation of data rate parameters during periods when they are not transmitting data or, if sufficient computing resources exist at the data sources, during periods when they are transmitting data. For example, if a reduction of allocated bandwidth slows the rate at which a data source can transmit data, the data source may be able to use the time while it waits to transmit the data to perform the monitoring, analysis, and estimation of data rate parameters.

Figure 1:
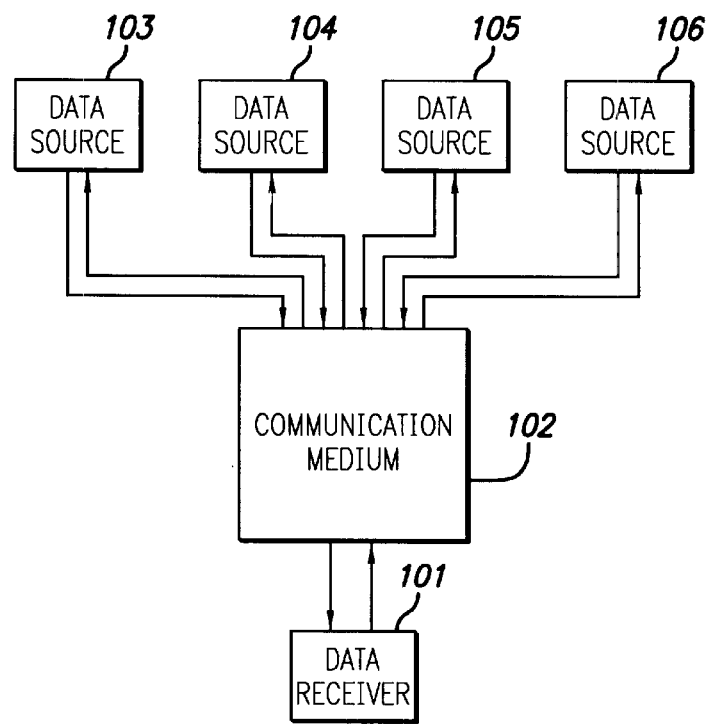
FIG. 1 is a block diagram illustrating a system comprising multiple data sources according to one embodiment of the invention.

FIG. 1 is a block diagram illustrating a system comprising multiple data sources according to one embodiment of the invention. The system comprises data receiver 101, communication medium 102, and data source 103, 104, 105, and 106. Data receiver 101 is coupled to data sources 103–106 via communication medium 102, which is capable of passing information at a finite data rate. Each of data sources 103–106 transmits data to data receiver 101 through communication medium 102. Data sources 103–106 may transmit data regularly or irregularly at constant or varying data rates. Data receiver 101 is capable of passing information back to any of data sources 103–106.

Figure 2:
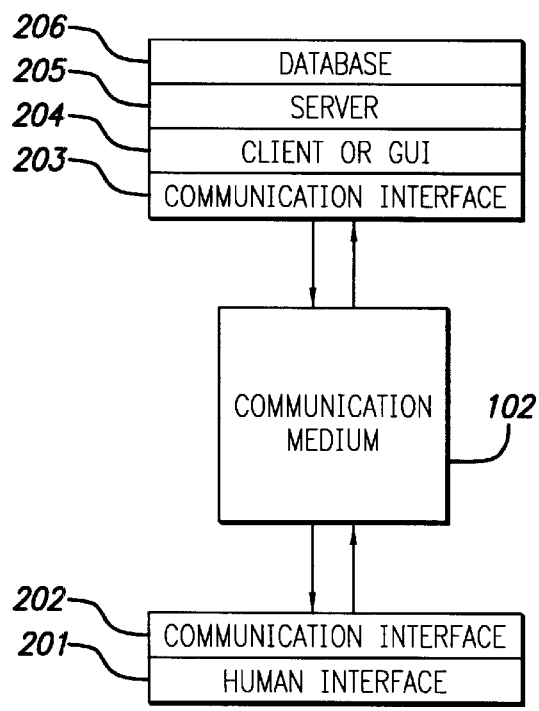
FIG. 2 is a block diagram illustrating a structure of a data source and a data receiver according to one embodiment of the invention.

FIG. 2 is a block diagram illustrating a structure of a data source and a data receiver according to one embodiment of the invention. The data source comprises human interface 201 and communication interface 202. Human interface 201 may be any type of apparatus for interaction with a human, for example, a keyboard, a display, a mouse or other pointing device, speakers or headphones, a microphone, any other human interface apparatus, or a combination thereof. Human interface 201 may also include other input/output devices, for example, a printer, scanner, card reader, biometric or other sensor, some other input/output device, or a combination thereof.

Human interface 201 is coupled to communication interface 202. Communication interface 202 allows communication between human interface 201 and communication medium 102. Communication interface 201 supports a bandwidth limitation capability according to one embodiment of the invention.

The data source may comprise a communication interface 203, and, optionally, a database 206, a server 205, and a client or graphic user interface (GUI) 204. Database 206 stores data. Server 205 allows access to database 206 for storage and retrieval of data therein. Client or GUI 204 utilizes server 204 to store and retrieve data from database 206. Client or GUI 204 presents data from database 206 is a textual or graphic form for presentation through human interface 201.

Client or GUI 204 is coupled to communication interface 203. Communication interface 203 allows communication between client or GUI 204 and communication medium 102. Communication interface 203 supports a bandwidth limitation capability according to one embodiment of the invention.

Figure 3:
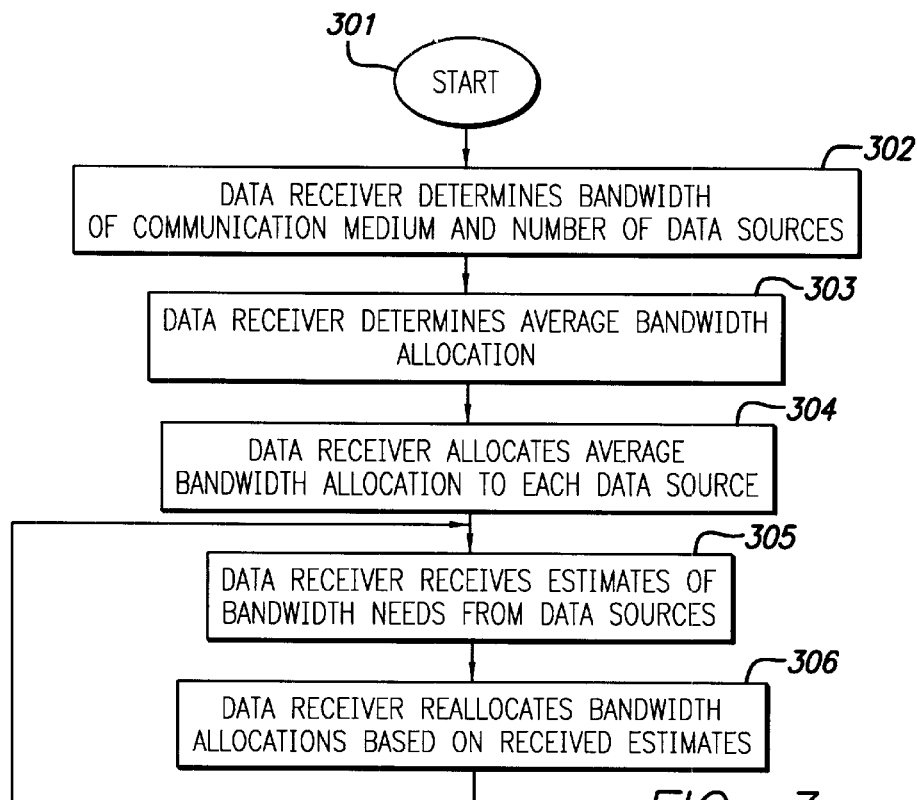
FIG. 3 is a flow diagram illustrating a process performed by a data receiver according to one embodiment of the invention.

FIG. 3 is a flow diagram illustrating a process performed by a data receiver according to one embodiment of the invention. The process begins in step 301. In step 302, the data receiver determines the bandwidth of the communication medium and the number of data sources that will be transmitting data. In step 303, the data receiver determines the average bandwidth allocation for each data source by dividing the bandwidth of the communication medium by the number of data sources. In step 304, the data receiver allocates the average bandwidth allocation determined in step 303 to each data source. The data receiver informs each data source of its bandwidth allocation.

In step 305, the data receiver receives estimates of bandwidth needs from the data sources. In step 306, the data receiver reallocates bandwidth allocations based on the estimates received from the data sources. The data receiver informs each data source of its newly determined bandwidth allocation. From step 306, the process returns to step 305.

Figure 4:
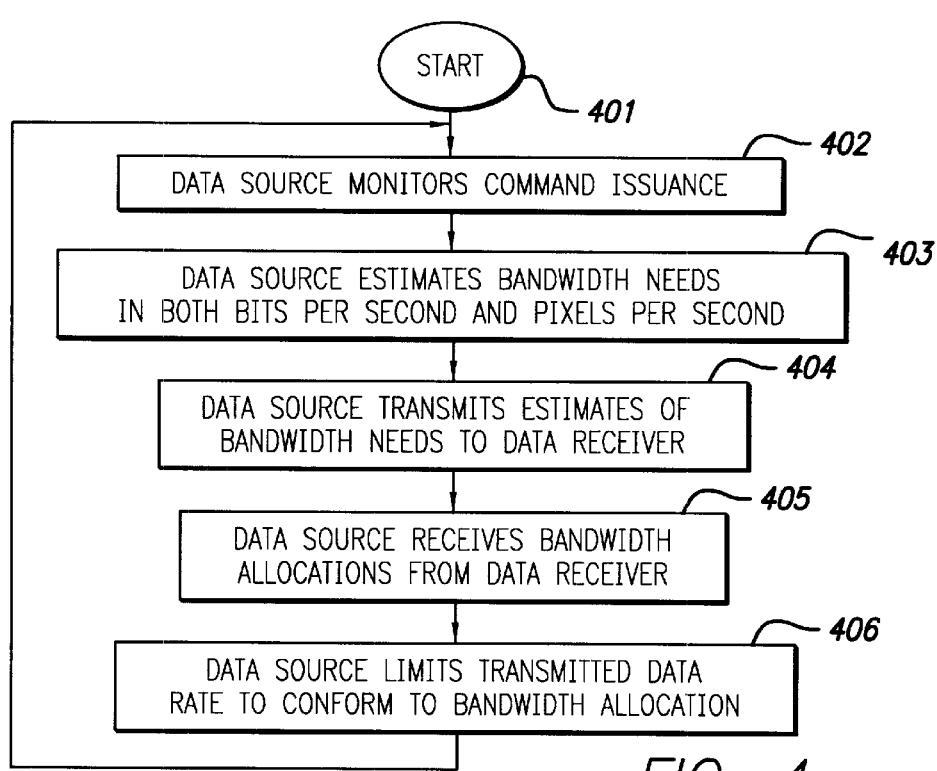
FIG. 4 is a flow diagram illustrating a process performed by a data source according to one embodiment of the invention.

FIG. 4 is a flow diagram illustrating a process performed by a data source according to one embodiment of the invention. The process begins in step 401. In step 402, the data source monitors command issuance. For example, the data source can monitor commands issued by a server to a client or vice versa.

In step 403, the data source estimates bandwidth needs in bits per second and/or pixels per second. These estimates are derived from the monitoring of command issuance. The data source calculates the number of bits or pixels that will be generated by a command and the period of time over which they will be generated. By dividing the number of bits or pixels by the period of time, a bits per second or pixels per second value is generated. The data source statistically combines these values with historical data for these values to produce statistical values. One example of these statistical values is a set of values representative of the mean plus one standard deviation of the bits per second and pixels per second values. These statistical values are used to produce an estimate of bandwidth needs in both bits per second and pixels per second.

In step 404, the data source transmits the estimates of bandwidth needs to a data receiver. In step 405, the data source receives a bandwidth allocation from the data receiver. In step 406, the data source limits its transmitted data rate to conform to the bandwidth allocation.

Figure 5:
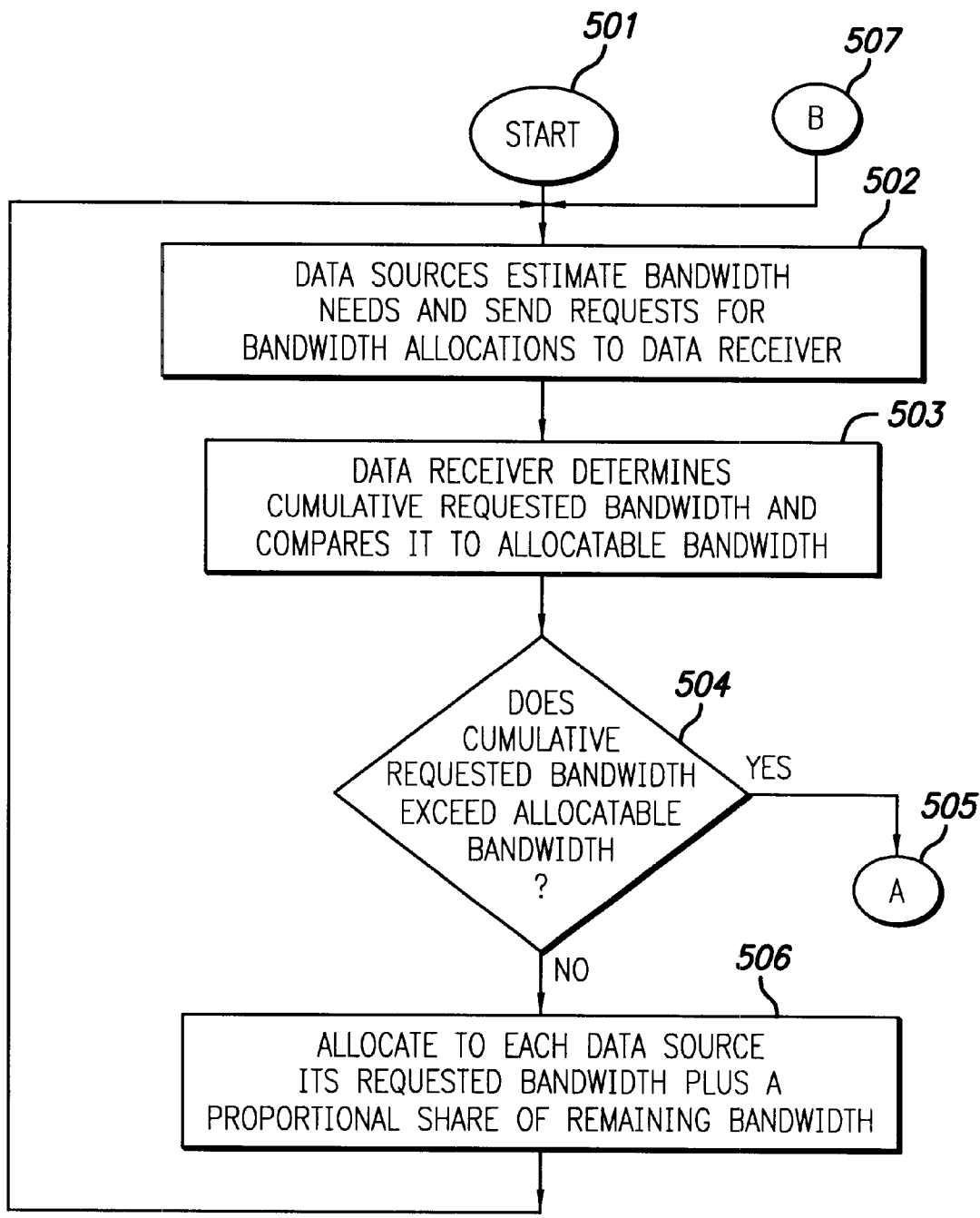
FIG. 5 is a flow diagram illustrating a bandwidth allocation process according to one embodiment of the invention.

FIG. 5 is a flow diagram illustrating a bandwidth allocation process according to one embodiment of the invention. The process begins in step 501. In step 502, the data sources estimate bandwidth needs and send requests for bandwidth allocations to a data receiver. In step 503, the data receiver determines the cumulative requested bandwidth and compares it to the allocatable bandwidth. The allocatable bandwidth includes bandwidth of a communication medium that can be allocated for the communication of transmission. For example, the allocatable bandwidth may or may not include additional bandwidth used to facilitate communication, such as packet addressing information, a preamble, or other overhead.

In step 504, a decision is made as to whether or not the cumulative requested bandwidth exceeds the allocatable bandwidth. If it does, the process continues at reference 505, which corresponds to references 505 of FIG. 6. If it does not, the process continues at step 506. In step 506, the amount of bandwidth requested by a data source plus a proportional share of remaining bandwidth is allocated to each data source. From step 506, the process returns to step 502.

Figure 6:
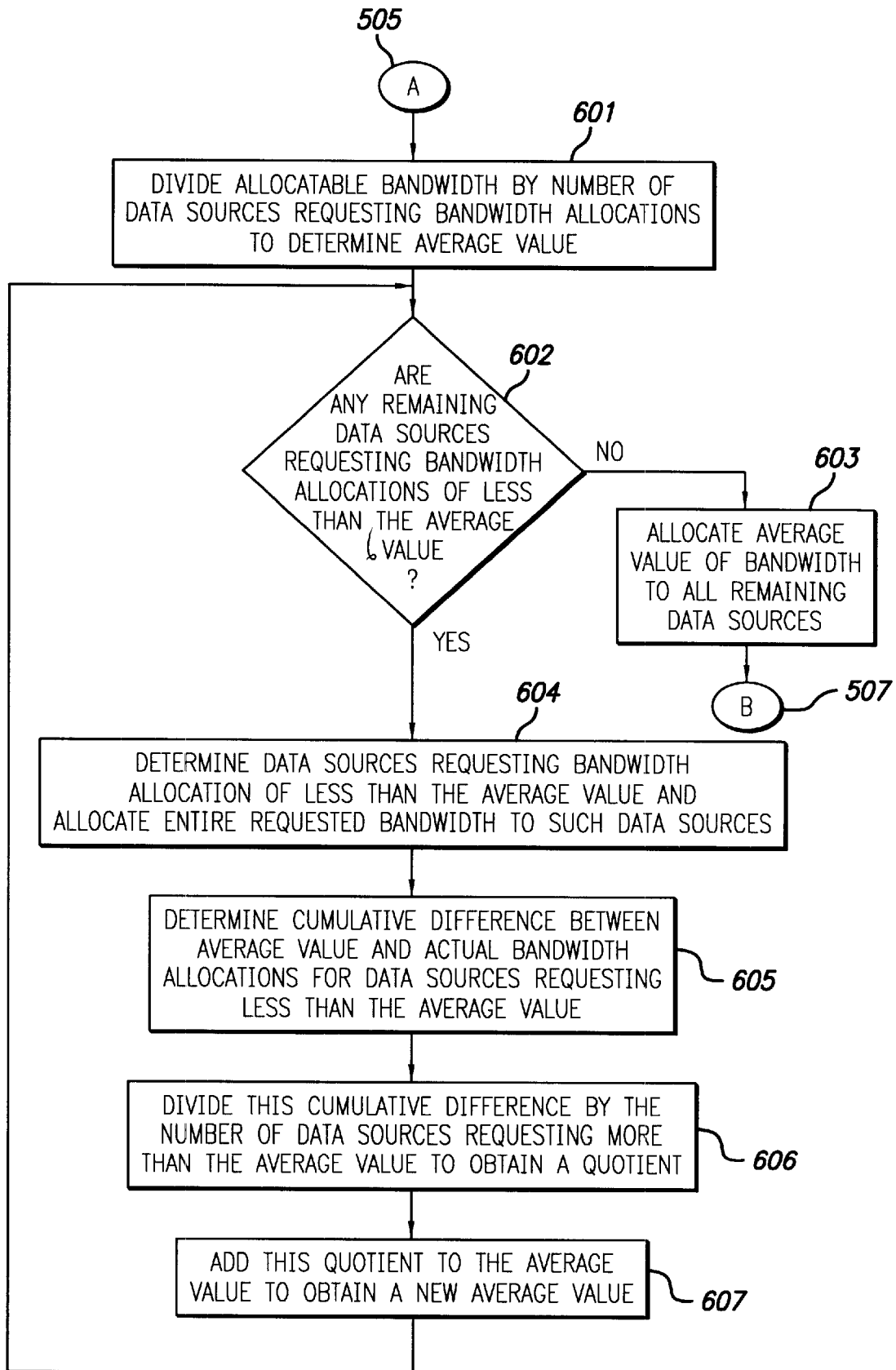
FIG. 6 is a flow diagram illustrating a process for allocating bandwidth when the cumulative requested bandwidth exceeds the allocatable bandwidth according to one embodiment of the invention.

FIG. 6 is a flow diagram illustrating a process for allocating bandwidth when the cumulative requested bandwidth exceeds the allocatable bandwidth according to one embodiment of the invention. The process continues from the process of FIG. 5 at reference 505. From reference 505, the process continues at step 601. In step 601, the allocatable bandwidth is divided by the number of data sources requesting bandwidth allocations to determine an average value. In step 602, a decision is made as to whether or not any remaining data sources are requesting bandwidth allocations of less than the average value. If not, the process continues in step 603. In step 603, bandwidth equal to the average value is allocated to all remaining data sources. Alternatively, the bandwidth may be divided proportional to the excess demand or according to another appropriate allocation policy. From step 603, the process returns to step 502 of FIG. 5 via reference 507.

If, in step 602, there is at least one remaining data source requesting bandwidth allocations of less than the average value, the process continues in step 604. In step 604, the data sources requesting bandwidth allocations of less than the average value are determined and the entire requested bandwidth is allocated to such data sources. In step 605, the cumulative difference between the average value and the actual bandwidth allocations for data sources requesting less than the average value are determined. In step 606, cumulative difference is divided by the number of data sources requesting more than the average value to obtain a quotient. In step 607, the quotient is added to the average value to obtain a new average value. From step 607, the process returns to step 602.

An example to illustrate the above process is given below. If a communication medium providing a bandwidth of 100 Mbps is available, and 12 data sources are attempting to transmit 1, 1, 2, 4, 4, 8, 10, 12, 16, 20, 32, and 48 Mbps, respectively, for a total of 158 Mbps of requested bandwidth, it is clear that the requested bandwidth exceeds the available bandwidth by 58 percent.

First, an average bandwidth allocation is determined by dividing the 100 Mbps available bandwidth by the 12 data sources, resulting in an average of 8.33 Mbps per data source. This average bandwidth allocation is then allocated to each of the 12 data sources.

Next, data sources requesting less bandwidth than the average bandwidth allocation are identified. These include both data sources requesting 1 Mbps and 4 Mbps, as well as the data sources requesting 2 Mbps and 8 Mbps. The cumulative difference between the average bandwidth allocation allocated to these data sources and the bandwidth requested by these data sources is calculated. Since six of the 12 data sources are requesting less than the average bandwidth allocation of 8.33 Mbps, the average bandwidth allocation allocated to these six data sources is 6×8.33 Mbps=50 Mbps. The sum of the bandwidth requested by these six data sources is 1+1+2+4+4+8=20 Mbps. Thus, the cumulative difference between the average bandwidth allocation allocated to these data sources and the bandwidth requested by these data sources is 50 Mbps−20 Mbps=30 Mbps.

This cumulative difference is divided by the number of data sources requesting over the average bandwidth allocation of 8.33 Mbps. Since the data sources requesting 10, 12, 16, 20, 32, and 48 Mbps are all requesting over 8.33 Mbps, six of the twelve data sources are requesting more than the average bandwidth allocation of 8.33 Mbps. Thus, the cumulative difference divided by the number of data sources requesting over the average bandwidth allocation is 30 Mbps/6=5 Mbps.

Thus, 5 Mbps per data source requesting more than the average bandwidth allocation of 8.33 Mbps are available to be allocated among those data sources. Therefore, among the six data sources requesting more than 8.33 Mbps, each of their bandwidth allocations is increased to 8.33 Mbps+5 Mbps =13.33 Mbps, which is a new average bandwidth allocation among the data sources that have not received their full requested bandwidth allocation amounts.

The remaining data sources requesting more than the original average bandwidth allocation of 8.33 Mbps, but less than the new average bandwidth allocation of 13.33 Mbps, are identified. These include the data sources requesting 10 Mbps and 12 Mbps. The cumulative difference between the new average bandwidth allocation of 13.33 Mbps per data source and the requests for 10 Mbps and 12 Mbps is calculated. The sum of the new average bandwidth allocation allocated to these two data sources is 2×13.33=26.67 Mbps. The sum of the bandwidth requested by these two data sources is 10 Mbps+12 Mbps=22 Mbps. Thus, the cumulative difference for these two data sources is 26.67 Mbps−22 Mbps=4.67 Mbps.

The new cumulative difference for these two data sources is divided by the number of remaining data sources requesting more than the new average of 13.33 Mbps. The data source requesting more than the new average of 13.33 Mbps includes those data sources requesting 16, 20, 32, and 48 Mbps. Thus, there are four data sources requesting more than the new average of 13.33 Mbps, so the new cumulative difference divided by the number of remaining data sources requesting more than the new average of 13.33 Mbps is 4.67 Mbps /4=1.17 Mbps.

The new value of 1.17 Mbps is added to what had been the new average of 13.33 Mbps to obtain 13.33 Mbps+1.17 Mbps=14.50 Mbps. The number of data sources requesting more than 13.33 Mbps, but less than 14.50 Mbps is identified. Since there are no data source requesting more than 13.33, but less than 14.50 Mbps, all remaining data sources requesting more than 14.50 Mbps are allocated 14.50 Mbps regardless of the actual amount of bandwidth requested by these data sources. Thus, the total amount of bandwidth allocated to the 12 data sources is 1+1+2+4+4+8+10+12+ 14.5+14.5+14.5+14.5=100 Mbps. Therefore, all bandwidth of the communication medium available for allocation has been allocated, but the total bandwidth of the communication medium has not been exceeded.

One embodiment of the invention allows the application of weightings to the bandwidth estimates of the data sources. Such weightings can be used to modify the bandwidth allocation that would otherwise occur without such weightings. For example, if a user perceives what is deemed to be a particularly important data source to be transmitting data at an unacceptably low data rate because of a low bandwidth allocation, the user can increase the weighting of that data source relative to the other data sources in the bandwidth allocation process. This will result in some amount of allocatable bandwidth being redistributed from the other processes to the one having the higher weighting, thereby increasing the data rate at which the more highly weighted process can transmit data.

Likewise, a particular data source deemed to be less important can be given a lower weighting to sacrifice some of its allocated bandwidth for the benefit of other more important data sources. Individual weightings can be applied to each data source, or a default weighting can be given to all data sources with specific weightings applied to particular data sources as desired. The weightings may be applied as factors multiplied by the estimates of bandwidth needs for each data source.

One embodiment of the invention provides for dynamic reallocation of available bandwidth. One manner in which dynamic reallocation is provided is that adjustments to allocations previously made to data sources can be made, thereby updating the previous allocations and effectively reallocating the available bandwidth of the communication medium.

Another aspect of the dynamic reallocation of available bandwidth is that bandwidth allocations may be defined to be valid only for a period of time. For example, allocations may be valid only for a period of time ranging from 1 mS to 10 seconds, such as a period of 100 mS. A data source receives a new allocation to allow continued communications after the expiration of the previous allocation.

Figure 7:
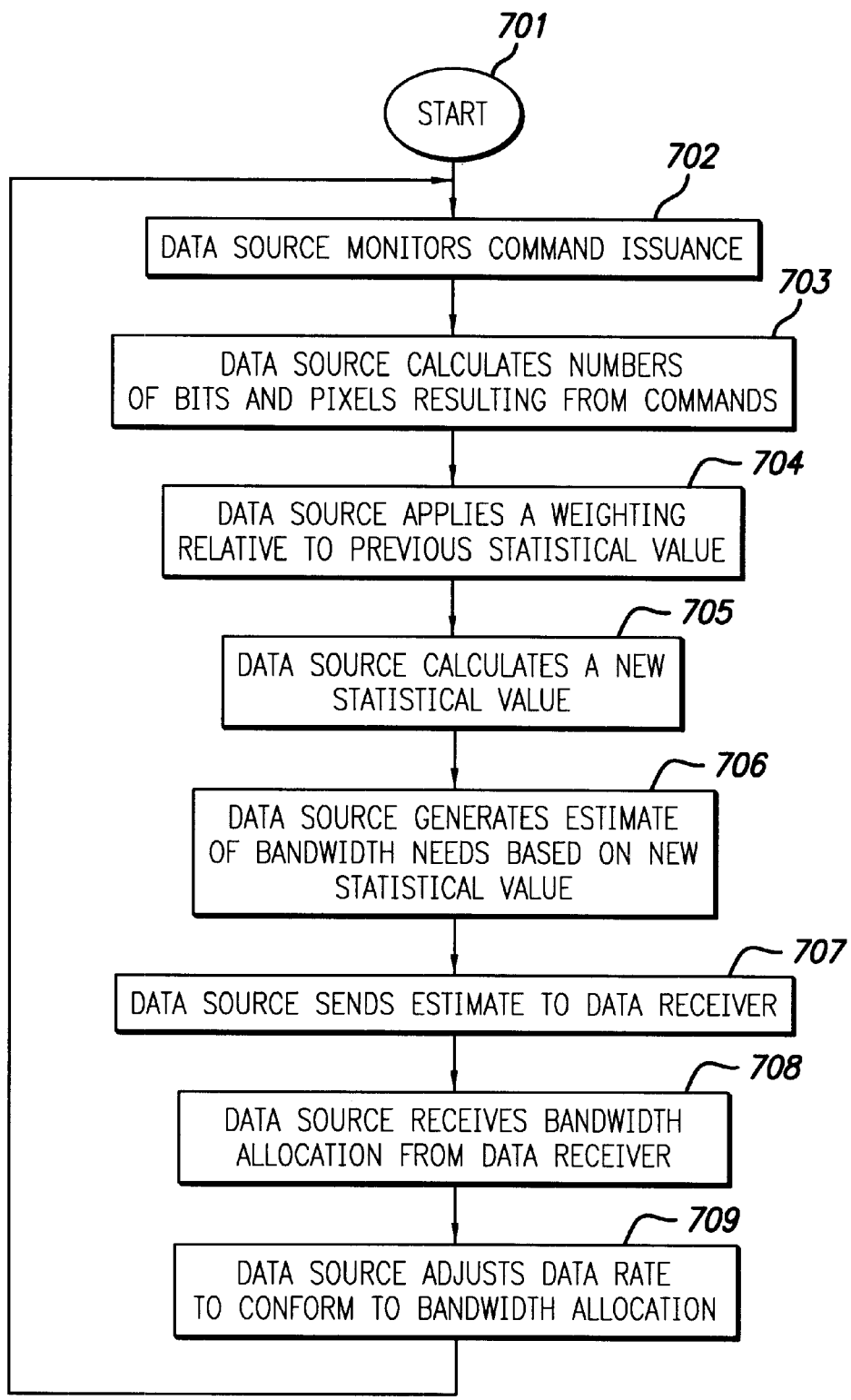
FIG. 7 is a flow diagram illustrating a process for determining and adjusting bandwidth needs according to one embodiment of the invention.

FIG. 7 is a flow diagram illustrating a process for determining and adjusting bandwidth needs according to one embodiment of the invention. The process begins in step 701. In step 702, the data source monitors command issuance. In step 703, the data source calculates numbers of bits and/or pixels that can be expected to result from the execution of the monitored commands. In step 704, the data source applies a weighting relative to a previous statistical value. For example, if $a_i$ is a statistical value such as an average plus one standard deviation, the data source applies a weighting x when calculating a new average plus one standard deviation such that $a_{i+1}=(x)a_i+(1-x) S_{i+1}$. Thus, $a_{i+1}=a_i+(S_{i+1}-a_i)(1-x))$. By selecting the appropriate weighting x, the importance of the new value $S_{i+1}$ relative to the previous statistical value $a_i$ can be controlled. In step 705, the data source calculates a new statistical value. In step 706, the data source generates an estimate of bandwidth needs based on the new statistical value. In step 707, the data source sends an estimate to the data receiver. In step 708, the data source receives a bandwidth allocation from the data receiver. In step 709, the data source adjusts its data rate to conform to the bandwidth allocation received from the data receiver.

Figure 11:
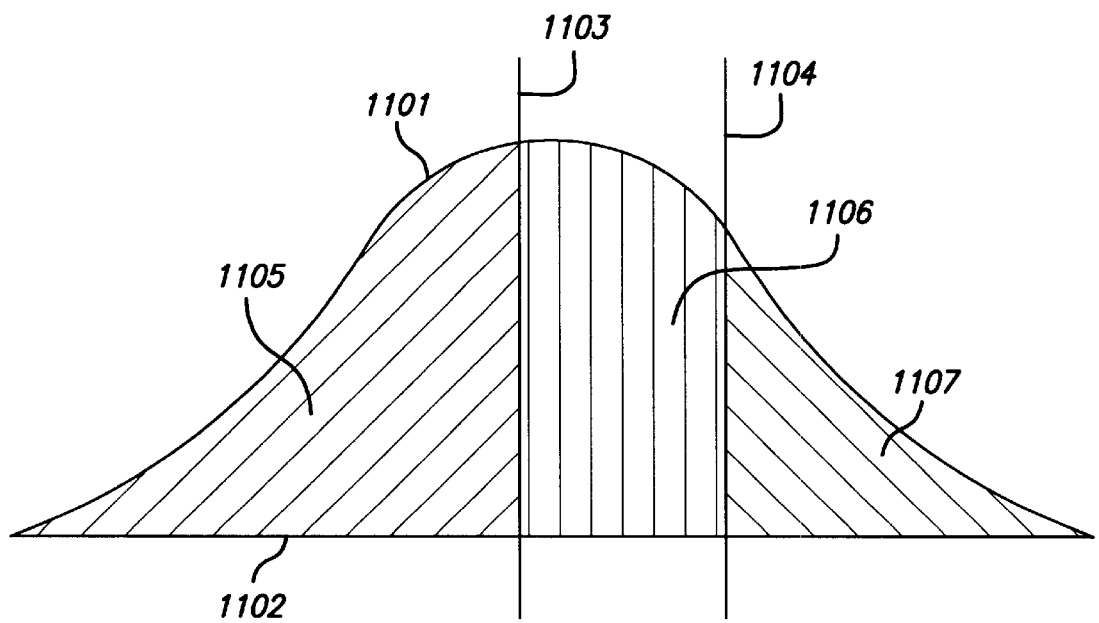
FIG. 11 is a drawing of a normal distribution curve illustrating a graphical representation of a statistical value approximating a mean plus one standard deviation.

FIG. 11 is a drawing of a normal distribution curve illustrating a graphical representation of a statistical value approximating a mean plus one standard deviation. Normal distribution curve 1101 is illustrated over baseline 1102. Vertical line 1103 represents the mean value of the numerical information represented by normal distribution curve 1101. Vertical line 1104 represents a value equal to the mean plus one standard deviation.

The area between normal distribution curve 1101 and baseline 1102 is divided into three regions. These three regions are region 1105 representing numerical information having values less than the mean value 1103, region 1106 representing numerical information having values between mean value 1103 and mean plus one standard deviation 1104, and region 1107 representing numerical information having values greater than mean plus one standard deviation 1104.

If bandwidth needs were estimated based on mean value 1103, there would be a roughly equal chance that the actual bandwidth needs would fall below the estimate (in region 1105) or above the estimate (in either of regions 1106 or 1107). Thus, it would be substantially likely that the estimate would be an underestimate of actual bandwidth needs.

However, by using the mean plus one standard deviation 1104 as a basis for estimation of bandwidth needs, it will be very likely that the actual bandwidth needs will fall below the estimate (in region 1105 or 1106) rather than above the estimate (in region 1107). Thus, the bandwidth requested according to such an estimate will usually be adequate to handle the actual bandwidth needs of the data source. While events in region 1107 will still exceed the estimate, an estimate farther to the right along normal distribution curve 1101 would substantially increase the requested bandwidth while providing benefit only rarely. Thus, the mean plus one standard deviation 1104 provides a useful statistical value for efficiently estimating bandwidth needs.

Figure 8:
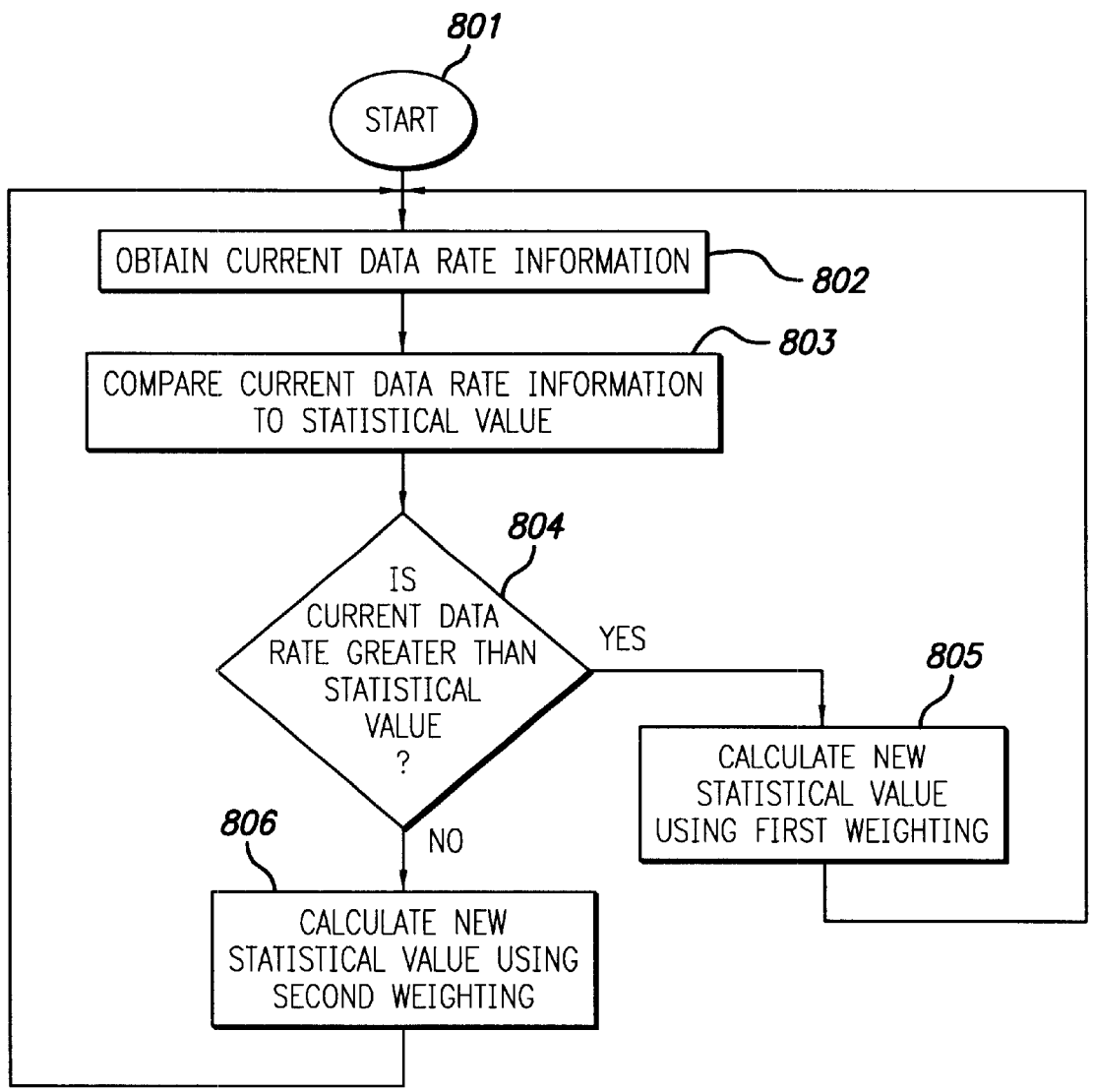
FIG. 8 is a flow diagram illustrating a process for asymmetric tracking of data rate information.

FIG. 8 is a flow diagram illustrating a process for asymmetric tracking of data rate information. The process begins in step 801. In step 802, the current data rate information is obtained. In step 803, the current data rate information is compared to the statistical value. In step 804, a decision is made as to whether or not the current data rate is greater than the statistical value. If so, the process continues in step 805.

In step 805, a new statistical value is calculated using a first weighting. or example, a new statistical value can be generated according to the following equation: $a_{i+1}=x_1 a_i + (1-x_1)S_{i+1}$, where the first weighting is $x_1$. From step 805, the process returns to step 802. If, in step 804, the decision is made that the current data rate is not greater than the statistical value, the process continues in step 806. In step 806, a new statistical value is calculated using a second weighting. For example, a new statistical value can be generated according to the following equation: $a_{i+1}=x_2a_i+(1-x_2)S_{i+1}$, where the second weighting is $X_2$. From step 806, the process returns to step 802.

By selecting appropriate values for $x_1$ and $x_2$ in the above equations, a statistical value, such as an approximation of a mean plus one standard deviation, may be calculated. Furthermore, by selecting $x_1<x_2$, the new statistical value $a_{i+1}$ will be affected more by a new value $S_{i+1}$ greater than the previous statistical value $a_i$ than by a new value $S_{i+1}$ less than the previous statistical value ai. Thus, the process will exhibit a "fast up, slow down" characteristic in which the statistical value will be influenced more by peaks in the S values than by lulls in the S values.

When applied to the estimation of bandwidth needs, such behavior will tend to prevent data sources that may transmit intermittent bursts of data with lengthy lulls between the bursts from underestimating their future bandwidth needs because of the influence of the lengthy bursts of data in the estimation process. Rather, the bandwidth needed by the data bursts will tend to dominate the estimation calculations.

Congestion Avoidance

Efficient bandwidth management allocates exactly the amount of available bandwidth. If less than the available amount of bandwidth is allocated, the unallocated bandwidth will be wasted. However, if more than the available amount of bandwidth is allocated, not all data that is attempted to be transmitted will actually be transmitted; some of the data will be lost.

Another impediment to efficient bandwidth management is that occasional bursts of data may occur in excess of the typical data rates. Moreover, with multiple data sources, the timing of such occasional bursts of data may be independent among the multiple data sources, allowing for the possibility that more than one data source may transmit such a burst roughly simultaneously, thereby generating very high instantaneous traffic on the communication medium. If the data rate of such traffic exceeds the bandwidth of the communication medium, data will be lost.

Thus, a technique is provided for avoiding congestion of the communication medium. This technique benefits from high reliability of modern communication media within their available bandwidths. For example, the incidence of data packet loss resulting from electrical interference is typically on the order of $10^{-12}$. Thus, the technique utilizes a reasonable assumption that all lost data packets over a communication medium result from congestion of the communication medium.

As discussed above, a data receiver according to one embodiment of the invention allocates the bandwidth of the communication medium over which it receives data to assure adequate bandwidth such that it can receive all data that a set of multiple data sources can transmit. Nevertheless, the possibility exists that network switches incorporated in the communication medium may drop packets if their internal buffers overflow from excessive traffic. Furthermore, although a data receiver has allocated resources to provide the designated amount of aggregate bandwidth over a period, bursts of data from multiple data sources may arrive essentially simultaneously, thereby overloading the data receiver's buffers and resulting in lost data packets. Additionally, congestion may result when a data source does not immediately recognize that its bandwidth allocation was cut before it sent a large number of commands or a large amount of data.

In any event, a data source can rely on the reasonable assumption that data losses are caused by congestion. If the data source responds to the detection of data losses by blindly sending error corrections at that point at the full data rate allocated to it, the congestion will likely be exacerbated.

Thus, one embodiment of the invention provides a congestion avoidance technique. According to one embodiment of this technique, a data source voluntarily limits its bandwidth use to an amount less than that allocated to it until the congestion situation improves. One example of a data source to which the present invention may be applied is a remote display device.

Figure 9A:
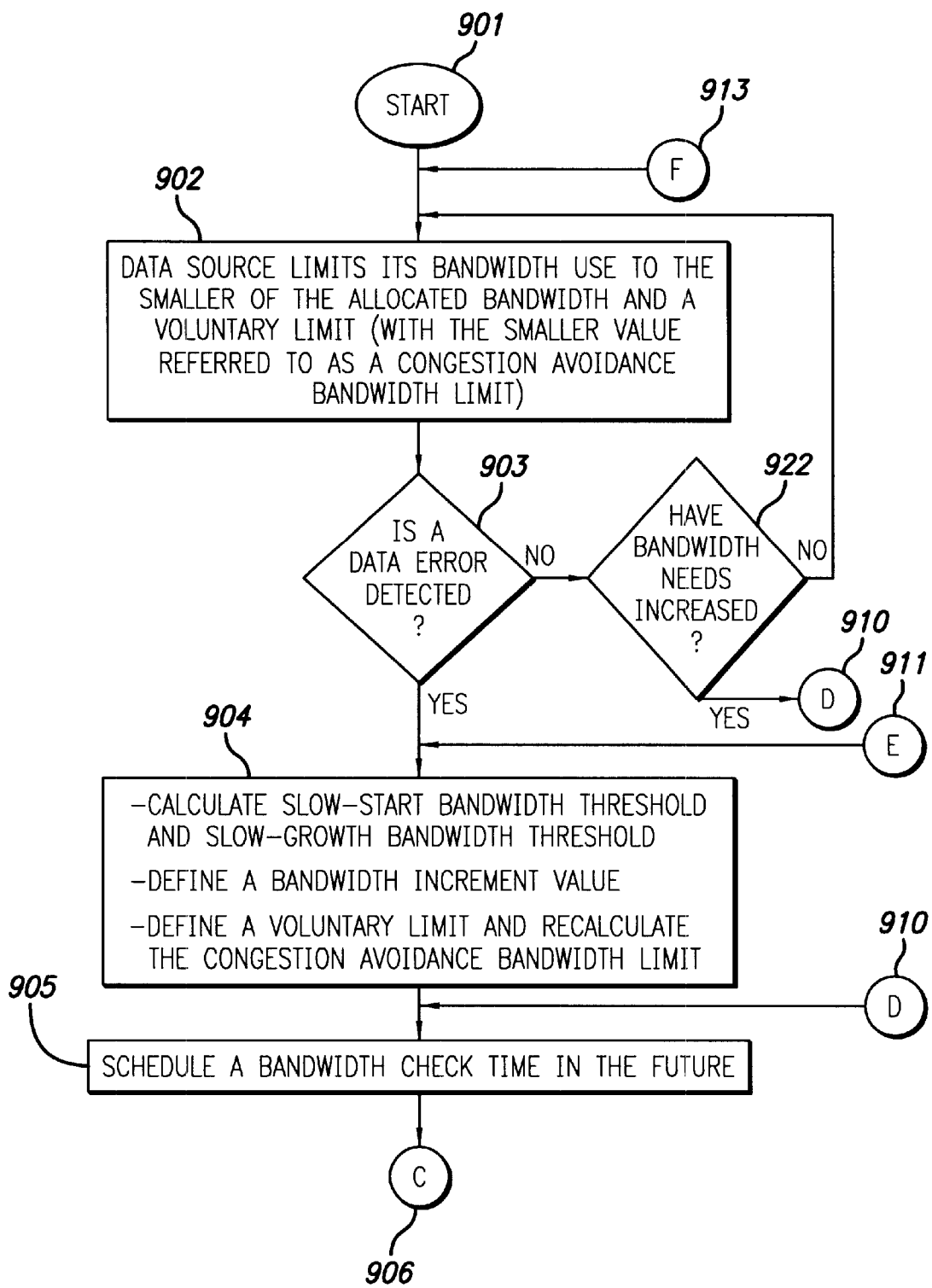
FIGS. 9A, 9B, and 9C are a flow diagram illustrating a process for congestion avoidance according to one embodiment of the invention.
Figure 9B:
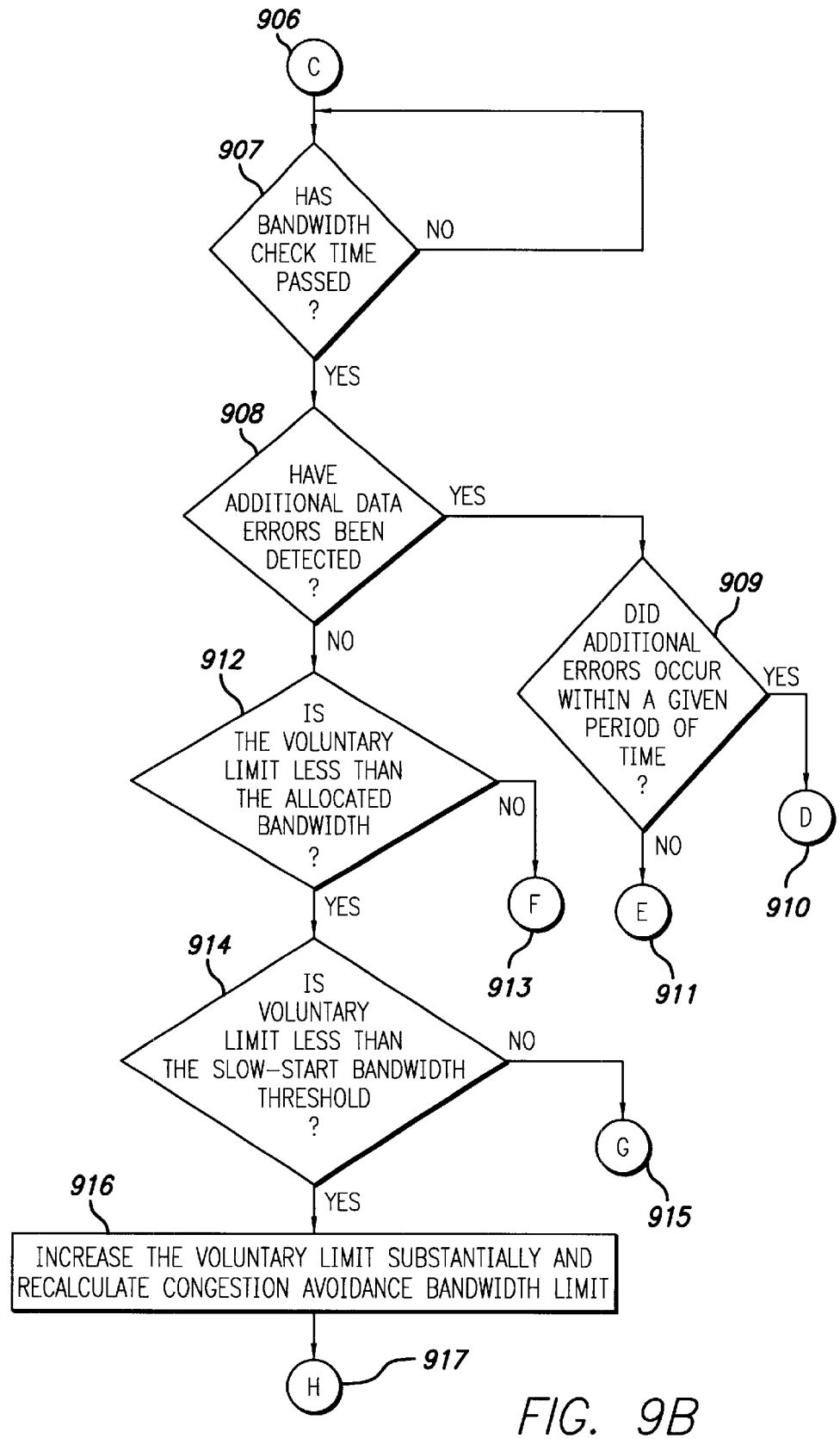
Figure 9C:
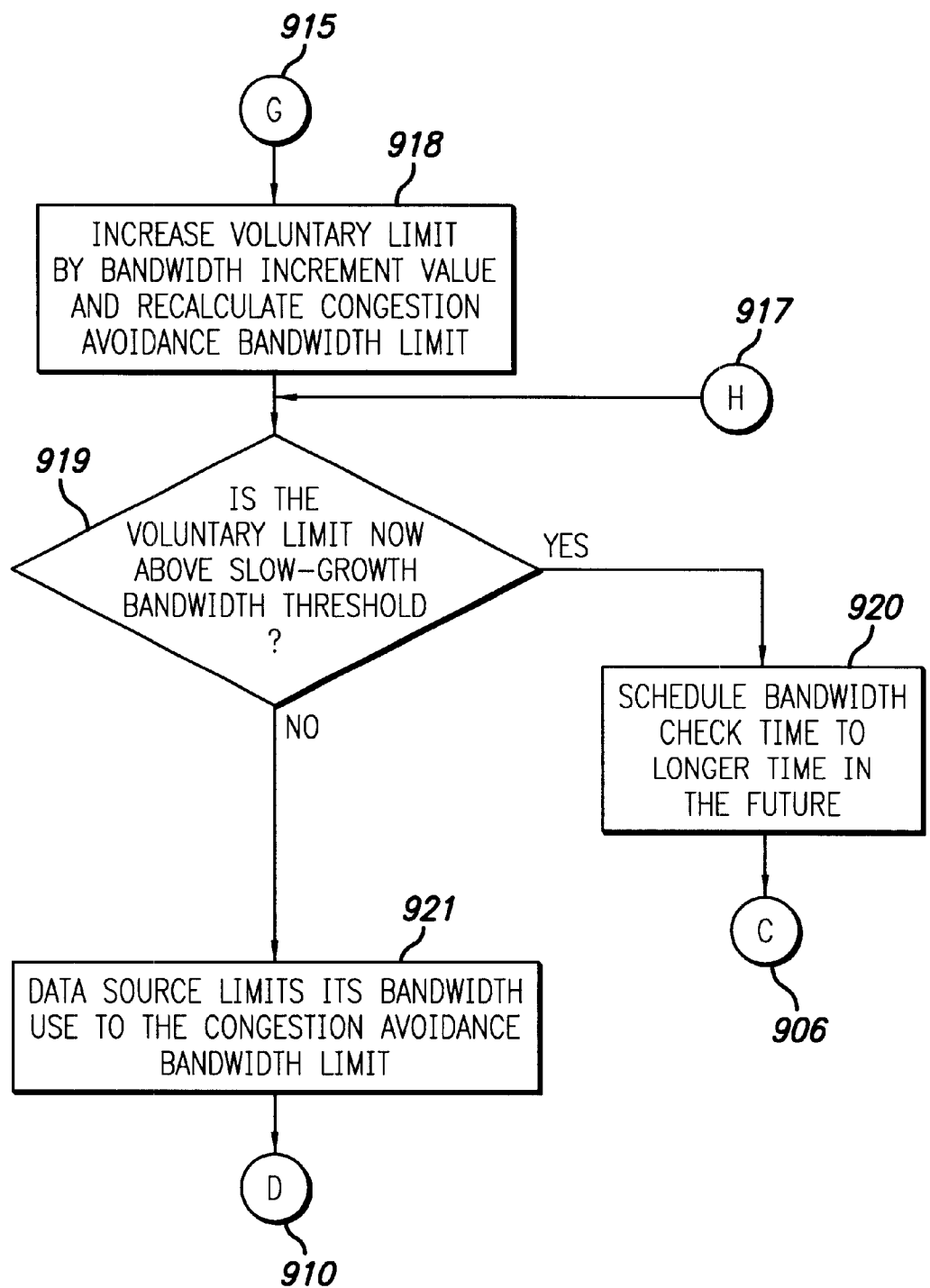

FIGS. 9A, 9B, and 9C are a flow diagram illustrating a process for congestion avoidance according to one embodiment of the invention. The process begins in step 901 and continues to step 902. In step 902, a data source limits the amount of bandwidth it is actually using to the smaller of the amount of bandwidth that has been allocated to it and a voluntary limit established by the data source itself. The smaller of the amount of allocated bandwidth and the voluntary limit is referred to as the congestion avoidance bandwidth limit.

In step 903, a decision is made as to whether or not a data error has been detected since the last time the process was at step 903. If not, the process continues to step 922. In step 922, a decision is made as to whether or not the bandwidth needs have increased. If so, the process continues to step 905 via reference 910. If not, the process returns to step 902. However, if in step 903 a data error has been detected, the process continues to step 904, where a slow-start bandwidth threshold and a slow-growth bandwidth threshold are calculated, a bandwidth increment value and a voluntary limit are defined, and the congestion avoidance bandwidth limit is recalculated. For example, the slow-start bandwidth threshold may be set to be some fraction of the current congestion avoidance bandwidth limit. As an example, this fraction may be in the range of 0.1 to 0.8, such as 0.5 of the current congestion avoidance bandwidth limit.

The slow-growth bandwidth threshold may, for example, be set to some fraction of the current congestion avoidance bandwidth limit. As an example, this fraction may be in the range of 0.2 to 0.9, such as 0.75 of the current congestion avoidance bandwidth limit. The bandwidth increment value may be set to some fraction of the current congestion avoidance bandwidth limit. As an example, this fraction may be in the range of 0.005 to 0.3, such as 0.03125 of the current congestion avoidance bandwidth limit. The voluntary limit may be set to some fraction of the current congestion avoidance bandwidth limit. As an example, this fraction may be in the range of 0.005 to 0.9, such as 0.0625 of the current congestion avoidance bandwidth limit.

In step 905, a bandwidth check time is scheduled in the future. For example, the bandwidth check time may be scheduled for a period from 5 to 500 mS, such as 50 mS, in the future. From step 905, the process continues to step 907 via reference 906. In step 907, a decision is made as to whether or not the bandwidth check time has passed. If not, the process returns to step 907. If, however, the bandwidth check time has passed, the process continues to step 908.

In step 908, a decision is made as to whether or not additional data errors have been detected. If additional data errors have been detected, the process continues to step 909. In step 909, a decision is made as to whether or not additional errors occurred within a given period of time. For example, this given period of time may be a period of time between 50 mS and 5 seconds, such as 500 mS. If additional errors occurred within the given period of time, the process returns to step 905 via reference 910. If not, the process returns to step 904 via reference 911. If, in step 908, no additional errors have been detected, the process continues to step 912.

In step 912, a decision is made as to whether or not the voluntary limit is less than the allocated bandwidth. If not, the process returns to step 902 via reference 913. If, however, the voluntary limit is less than the allocated bandwidth, the process continues to step 914. In step 914, a decision is made as to whether or not the voluntary limit is less than the slow-start bandwidth threshold. If not, the process continues to step 918 via reference 915.

In step 918, the value of the voluntary limit is increased by the amount of the bandwidth increment value. From step 918, the process continues to step 919.

If in step 914, the voluntary limit is less than the slow-start bandwidth threshold, the process continues to step 916. In step 916, the voluntary limit is substantially increased. For example, the voluntary limit may be increased by multiplying it by a given factor. For example, if a given factor such as two is used, the voluntary limit is doubled in step 916. Other factors, for example, factors in the range of one to ten may be used. From step 916, the process continues to step 919 via reference 917.

In step 919, a decision is made as to whether or not the voluntary limit is now above the slow-growth bandwidth threshold. If so, a bandwidth check time is scheduled for a time in the future. This time in the future is farther into the future than the time into the future at which the bandwidth check time is scheduled in step 905. For example, the time into the future at which the bandwidth check time is scheduled in step 919 may be in the range of 100 mS to 10 seconds, such as one second into the future. From step 920, the process continues to step 907 via reference 906.

If, in step 919, the voluntary limit is not above the slow-growth bandwidth threshold, the process continues in step 921. In step 921, the data source limits the amount of bandwidth it is actually using to the congestion avoidance bandwidth limit. From step 921, the process returns to step 905 via reference 910.

The congestion avoidance technique according to one embodiment of the invention adheres to a principle that, if errors are caused by congestion, it is important for the data source to remain relatively quiet for some time to allow the congestion to be reduced. However, this principle is balanced against the principle that it is important for the data source to return to a typical rate of data transmission relatively quickly to avoid the perception of a long pause in the data provided by the data source. By quickly reducing the data rate to a low level, then doubling or otherwise quickly increasing the data rate until the data rate has been restored to some fraction, such as half, of its former value, these principles are effectively balanced, and the desired result is achieved. The data rate being used by the data source at the time the first error was detected may be used as this former value.

Once the data rate has been restored to a substantial fraction, such as half, of its former value, the data rate is increased relatively slowly to a higher fraction of its former value, such as 0.75. Once the data rate has reached this higher fraction of its former value, the data rate is increased even more slowly. This process effectively allows a "probing" effect to determine if the high level of the former data rate contributed to the data error that was detected. If, as the data rate is increased toward its former level, additional error are detected, the data rate is again reduced and gradually increased to reduce additional congestion. Otherwise, if no further data errors are experienced, the process increases the amount of bandwidth used by the data source to the full amount of bandwidth allocated to the data source.

Figure 10:
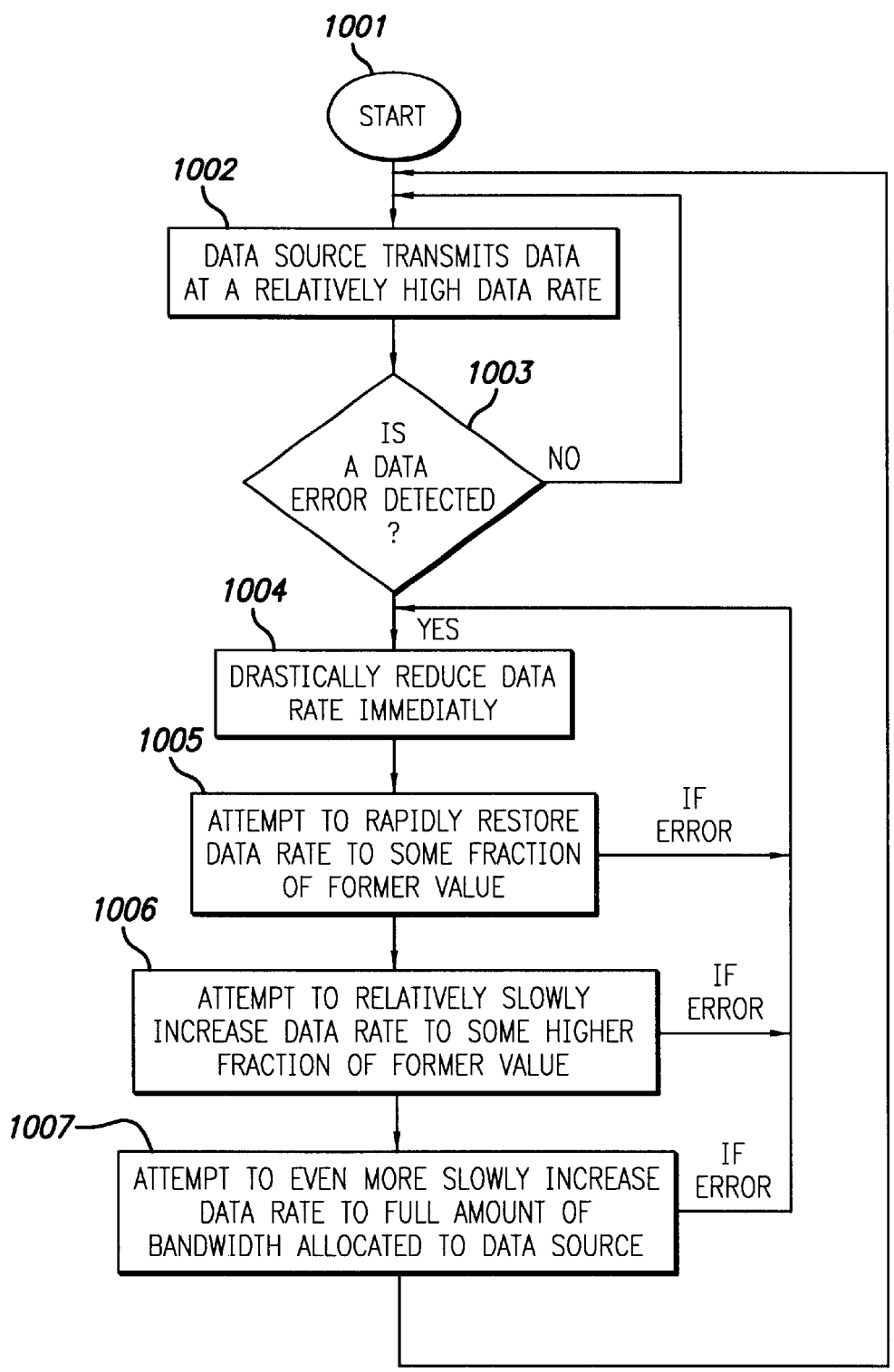
FIG. 10 illustrates an example of the congestion avoidance technique according to one embodiment of the invention.

FIG. 10 illustrates an example of the congestion avoidance technique according to one embodiment of the invention. The process begins in step 1001 and continues in step 1002. In step 1002, a data source transmits data at a relatively high data rate. In step 1003, a decision is made as to whether or not a data error is detected. If no data error is detected, the process returns to step 1002. If, however, a data error is detected, the process continues to step 1004. In step 1004, the data source drastically reduces its data rate immediately.

In step 1005, the data source attempts to rapidly restore its data rate to some fraction, for example half, of its former value. If a data error is detected, the process returns to step 1004. Otherwise, the process continues to step 1006. In step 1006, the data source attempts to relatively slowly increase its data rate to some higher fraction of its former value, for example, 0.75. If a data error is detected, the process returns to step 1004. Otherwise, the process continues to step 1007.

In step 1007, the data source attempts to even more slowly increase its data rate to the full amount of bandwidth allocated to the data source. From step 1007, the process returns to step 1002.

Thus, a method and apparatus for management of communications over media of finite bandwidth has been described in conjunction with one or more specific embodiments. The invention is defined by the claims and their full scope of equivalents.

What is claimed:

1. A method for allocating bandwidth comprising the step of:
receiving estimates of bandwidth needs from a plurality of data sources;
allocating bandwidth to said plurality of data sources based on said estimates, wherein said allocating step comprises:
obtaining a cumulative requested bandwidth;
allocating a full amount of said estimate of bandwidth plus a proportional share of remaining bandwidth needs if said cumulative requested bandwidth is less than an allocatable bandwidth amount;
determining an average bandwidth value;
allocating an entire requested bandwidth when said estimate is less than said average bandwidth value;
obtaining a cumulative difference between said average bandwidth value and actual bandwidth;
obtaining a quotient by dividing said cumulative difference by a number of estimates greater than or equal to said average bandwidth value; and
adding said quotient to said average bandwidth value to obtain a new average bandwidth value.

2. The method of claim 1 further comprising:
monitoring command issuances; and
estimating bandwidth needs based on said command issuances.

3. The method of claim 2 wherein said estimating step comprises estimating bandwidth needs based on said command issuances and a weighting.

4. The method of claim 3 wherein said weighting is based on a mean plus one standard deviation.

5. The method of claim 1 further comprising:
allocating said average bandwidth value when said estimate is greater than or equal to said average bandwidth value.

6. The method of claim 1 further comprising at least one of said data sources utilizing a congestion avoidance bandwidth limit that is less than said allocated bandwidth.

7. The method of claim 1 further comprising:
transmitting data at a first data transmission rate;
detecting a data error;
rapidly reducing said first data transmission rate to a second data transmission rate;
rapidly restoring said second data transmission rate to a third data transmission rate, said third data transmission rate equal to a first fraction of said first data transmission rate; and
slowly increasing said third data transmission rate to a fourth data transmission rate, said fourth data transmission rate equal to a second fraction of said first data transmission rate.

8. A system comprising:
one or more data sources configured to transmit estimates of bandwidth needs;
a data receiver configured to: receive said estimates of bandwidth needs; allocate bandwidth to said one or more data sources and wherein said
data receiver is further configured to:
obtain a cumulative requested bandwidth;
allocate a full amount of said estimate of bandwidth plus a proportional share of remaining bandwidth needs if said cumulative requested bandwidth is less than an allocatable bandwidth amount;
determine an average bandwidth value;
allocate an entire requested bandwidth value when said estimate is less than said average bandwidth;
obtain cumulative difference between said bandwidth value and actual bandwidth;
obtain a quotient by dividing said cumulative difference by a number of estimates greater than or equal to said average bandwidth value; and
adding said quotient to said average bandwidth value to obtain a new average bandwidth value.

9. The system of claim 8 wherein at least one of said data sources is configured to:
monitor command issuances; and
estimate bandwidth needs based on said command issuances.

10. The system of claim 9 wherein said estimate is based on said command issuances and a weighting.

11. The system of claim 10 wherein said weighting is based on mean plus one standard deviation.

12. The system of claim 8 wherein said data receiver is further configured to:
allocate said average bandwidth value when said estimate is greater than or equal to said average bandwidth value.

13. The system of claim 8 wherein at least one of said data sources is configured to utilize a congestion avoidance bandwidth limit that is less than said allocated bandwidth.

14. The system of claim 8 wherein:
at least one of said data sources is configured to:
transmit data at a first data transmission rate;
detect a data error;
rapidly reduce said first data transmission rate to a second data transmission rate;
rapidly restore said second data transmission rate to a third data transmission rate, said third data transmission equal to a first fraction of said first data transmission rate; and
slowly increasing said data transmission rate to a fourth data transmission rate, said fourth data transmission rate equal to a second fraction of said first data transmission rate.

15. A computer program product comprising:
a computer usable medium having computer readable program code embodied therein configured to allocate bandwidth, said computer program product comprising:
computer readable program code configured to cause a computer to obtain estimates of bandwidth needs from a plurality of data sources;
computer readable program code configured to cause a computer to allocate bandwidth to said plurality of data sources based on said estimates, wherein said computer code configured to allocate comprises:
computer readable program code configured to cause a computer to obtain a cumulative requested bandwidth;
computer readable program code configured to cause a computer to allocate a full amount of said estimate of bandwidth plus a proportional share of remaining bandwidth needs if said cumulative requested bandwidth is less than an allocatable bandwidth amount;
computer readable program code configured to cause a computer to determine an average bandwidth value;
computer readable program code configured to cause a computer to allocate an entire requested bandwidth when said estimate is less than said average bandwidth value;
computer readable program code configured to cause a computer to obtain a cumulative difference between said average bandwidth value and actual bandwidth;
computer readable program code configured to cause a computer to obtain a quotient by dividing said cumulative difference by a number of estimates greater than or equal to said average bandwidth value; and
computer readable program code configured to cause a computer to adding said quotient to said average bandwidth value to obtain a new average bandwidth value.

16. The computer program product of claim 15 further comprising:
computer readable program code configured to cause a computer to monitor command issuances; and
computer readable program code configured to cause a computer to estimate bandwidth needs based on said command issuances.

17. The computer program product of claim 16 wherein said computer code configured to estimate comprises computer readable program code configured to cause a computer to estimate bandwidth needs based on said command issuances and a weighting.

18. The computer program product of claim 17 wherein said weighting is base on a mean plus one standard deviation.

19. The computer program product of claim 15 further comprising:
computer readable program code configured to cause a computer to allocate said average bandwidth value when said estimate is greater than or equal to said average bandwidth value.

20. The computer program product of claim 15 further comprising computer readable program code configured to cause a computer to utilize a congestion avoidance bandwidth limit that is less than said allocated bandwidth.

21. The compute program product of claim 15 further comprising:

computer readable program code configured to cause a computer to transmit data at a first data transmission rate;

computer readable program code configured to cause a computer to detect a data error;

computer readable program code configured to cause a computer to rapidly reduce said first data transmission rate to a second data transmission rate;

computer readable program code configured to cause a computer to rapidly restore said second data transmission rate to a third data transmission rate; said third data transmission rate equal to a first fraction of said first data transmission rate; and computer readable program code configured to cause a computer to slowly increase said third data transmission rate to a fourth data transmission rate, said fourth data transmission rate equal to a second fraction of said first data transmission rate.

\* \* \* \* \*